United States Patent [19]
Hartung et al.

[11] Patent Number: 5,094,497
[45] Date of Patent: Mar. 10, 1992

[54] VEHICLE AIR DEFLECTOR

[75] Inventors: Jesse C. Hartung, Bourbon; David P. Truman, Plymouth; Earl F. Dean, Bourbon, all of Ind.

[73] Assignee: Windswept Enterprises, Inc., Bourbon, Ind.

[21] Appl. No.: 602,473

[22] Filed: Oct. 24, 1990

Related U.S. Application Data

[63] Continuation-in-part of Ser. No. 426,661, Oct. 26, 1989, abandoned.

[51] Int. Cl.$^5$ .............................................. B62D 35/00
[52] U.S. Cl. .................................... 296/91; 296/180.1
[58] Field of Search ............................... 296/91, 180.1

[56] References Cited

U.S. PATENT DOCUMENTS 2,184,798 12/1939 Gracey .................................. 296/91
2,685,470 8/1954 Werner ......................... 296/180.1 X

OTHER PUBLICATIONS

J. C. Whitney & Co., Catalog 498J, pp. 150-151.

Primary Examiner—Dennis H. Pedder
Attorney, Agent, or Firm—Woodard, Emhardt, Naughton, Moriarty & McNett

[57] ABSTRACT

A deflector formed of a unitary strip of flexible material which is fastened to the vehicle hood at an edge immediate adjacent to the vehicle windshield. The deflector includes an upper wall part which directs bugs, water, debris and air away from and over the windshield to keep the windshield clean and to improve the handling and aerodynamics of the vehicle. The deflector further includes a securement to the rear edge of the hood, such as a clamp, and/or adhesive tape and/or a horizontal and a downward flange. The deflector is formed of plastic which is configured to bend to conform with the curvature of the rear edge of the hood. The deflector may be transparent, such as clear or transparent colors.

11 Claims, 9 Drawing Sheets

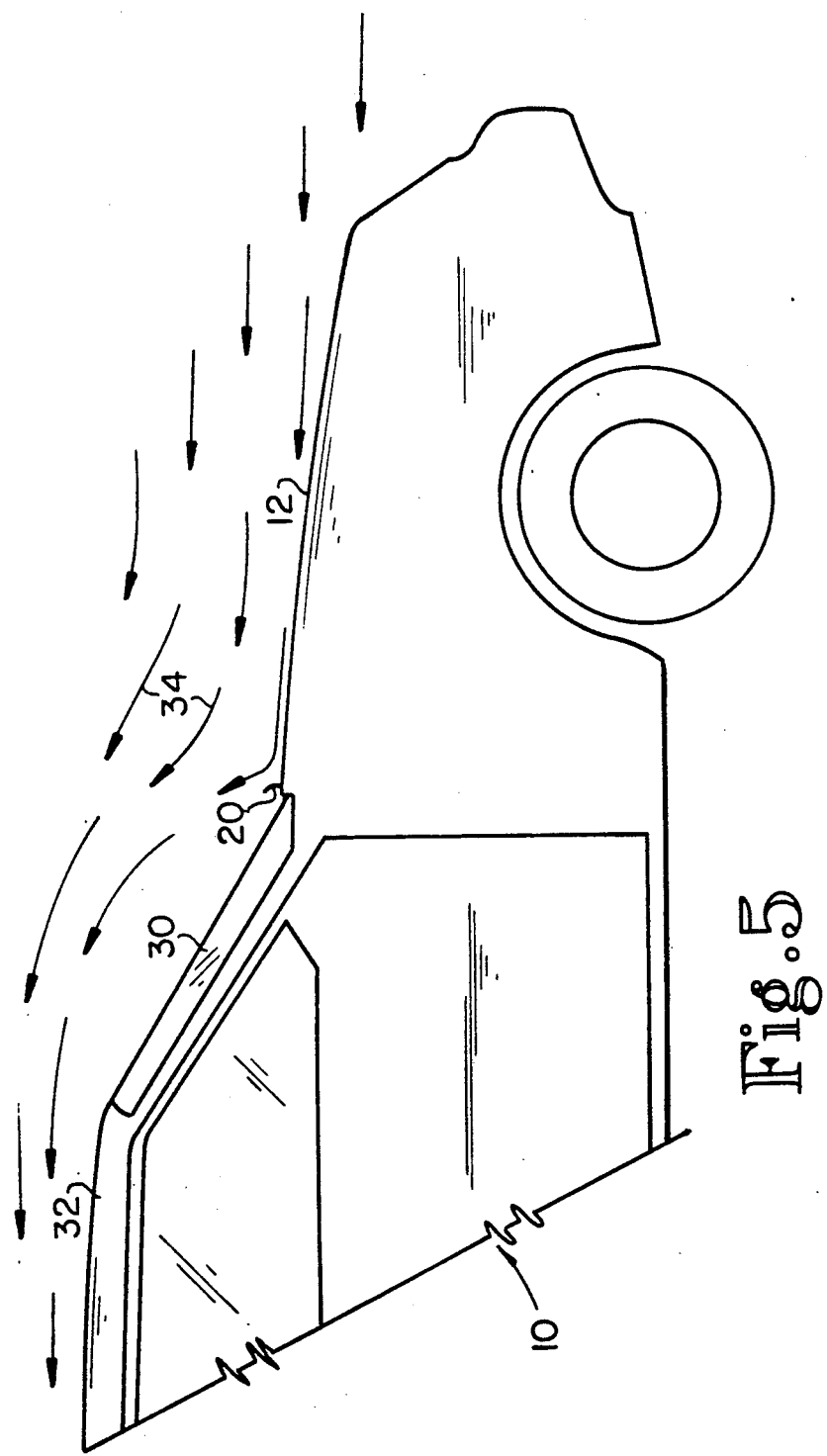

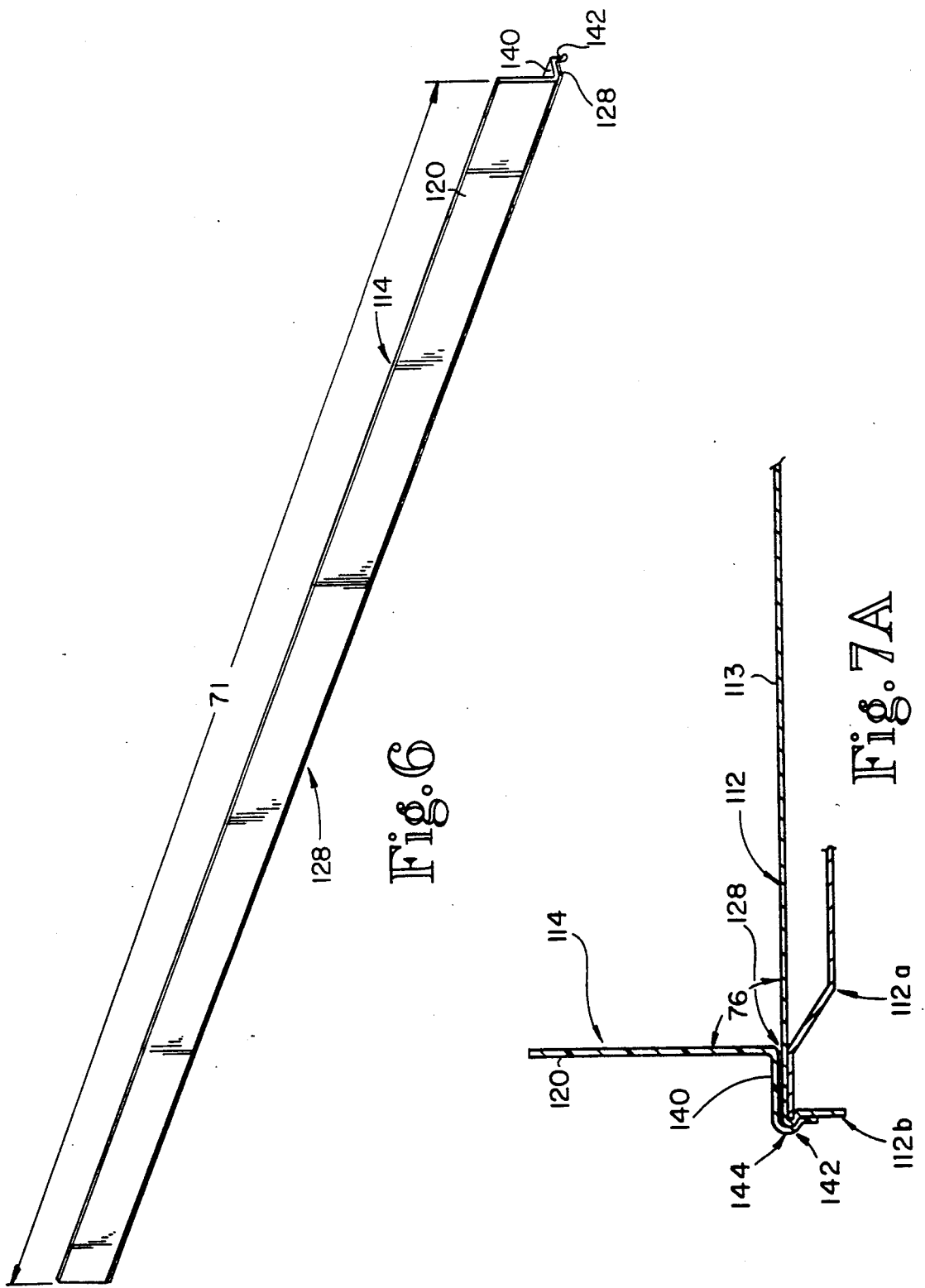

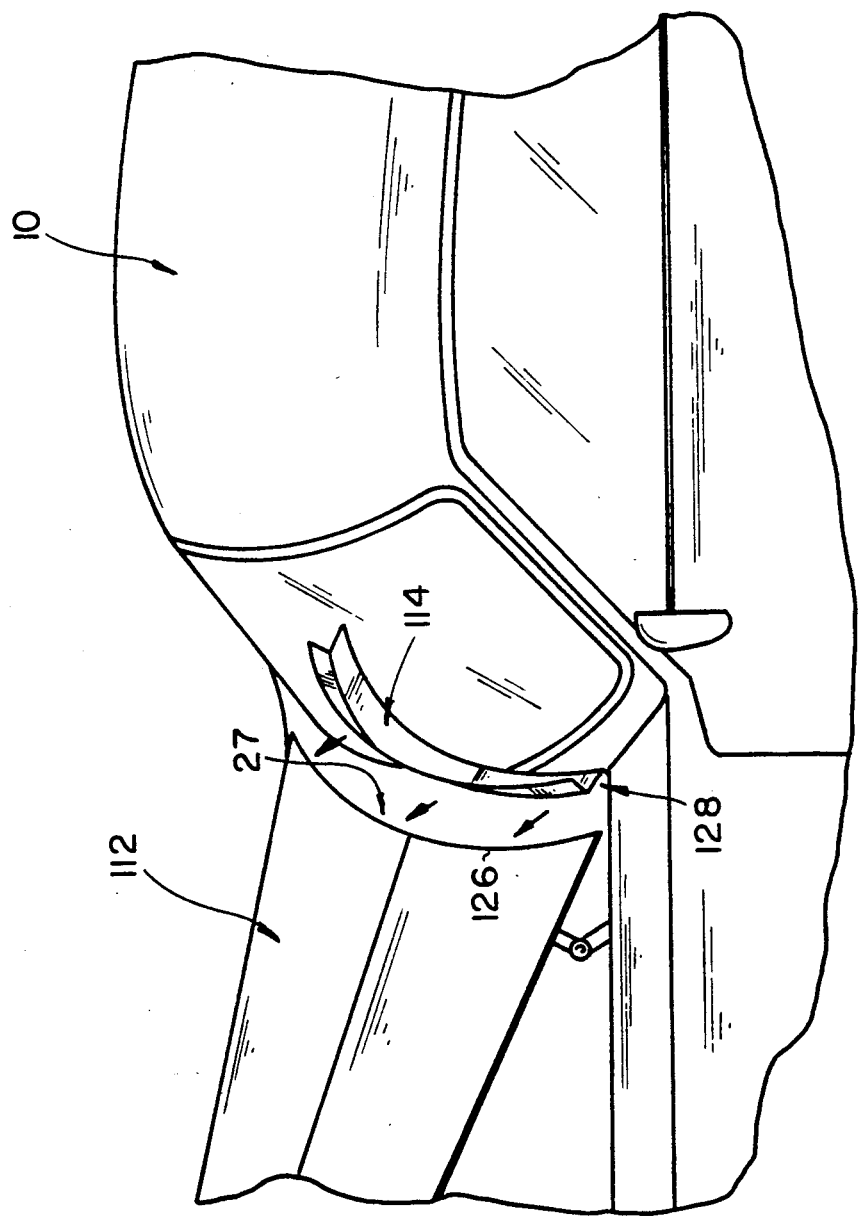

VEHICLE AIR DEFLECTOR

REFERENCE TO RELATED APPLICATIONS

This application is a continuation-in-part of U.S. Pat. application Ser. No. 426,661, filed on Oct. 26, 1989, now abandoned, by the same inventive entity, and entitled VEHICLE AIR DEFLECTOR.

BACKGROUND OF THE INVENTION

This invention relates to deflectors, and will have application to an air and/or bug deflector which enhances the aerodynamic performance of vehicles.

Current bug deflectors sold to the various automotive markets are designed to be mounted to the forward or leading edge of the vehicle, usually by way of mounting brackets. While these deflectors are somewhat efficient in deflecting insects and other debris before they reach the vehicle's windshield, they are relatively ineffective in an aerodynamic sense, and their positioning does allow some insects to splatter on the windshield.

SUMMARY OF THE INVENTION

The deflector of this invention is mounted to the rearward edge of the vehicle hood adjacent to the windshield. The deflector is of one piece construction and may be flexed and/or cut to accommodate various vehicle hood widths and configurations. An integral channel part serves to secure the deflector to the hood. One embodiment secures the deflector to the hood using a horizontal flange and a downward flange which lies behind the rear edge of the hood. Optional tape or mechanical fasteners may also be used to secure the deflector to the hood.

Accordingly, it is an object of this invention to provide a novel deflector for a vehicle.

Another object is to provide a vehicle air deflector which deflects bugs and other road debris away from the windshield.

Another object is to provide a vehicle air deflector which channels oncoming air over the top of the vehicle to improve aerodynamic response and handling.

Another object is to provide a vehicle air deflector which mounts to the vehicle without the use of externally visible fasteners.

Another object is to provide a vehicle air deflector which is economical and attractive.

Other objects will become apparent upon a reading of the following description.

BRIEF DESCRIPTION OF THE DRAWINGS

Preferred embodiments of the invention have been depicted for illustration purposes only wherein:

FIG. 5 is a fragmented elevation view of the deflector and vehicle.

FIG. 6 is a perspective view of a third embodiment of the deflector of this invention.

FIG. 7A is a cross-sectional view of the deflector of FIG. 6 on another alternative hood configuration.

FIG. 8B is a fragmented perspective view of the deflector of FIG. 6 being secured to the rear edge of an open hood.

DESCRIPTION OF THE PREFERRED EMBODIMENT

Figure 1:
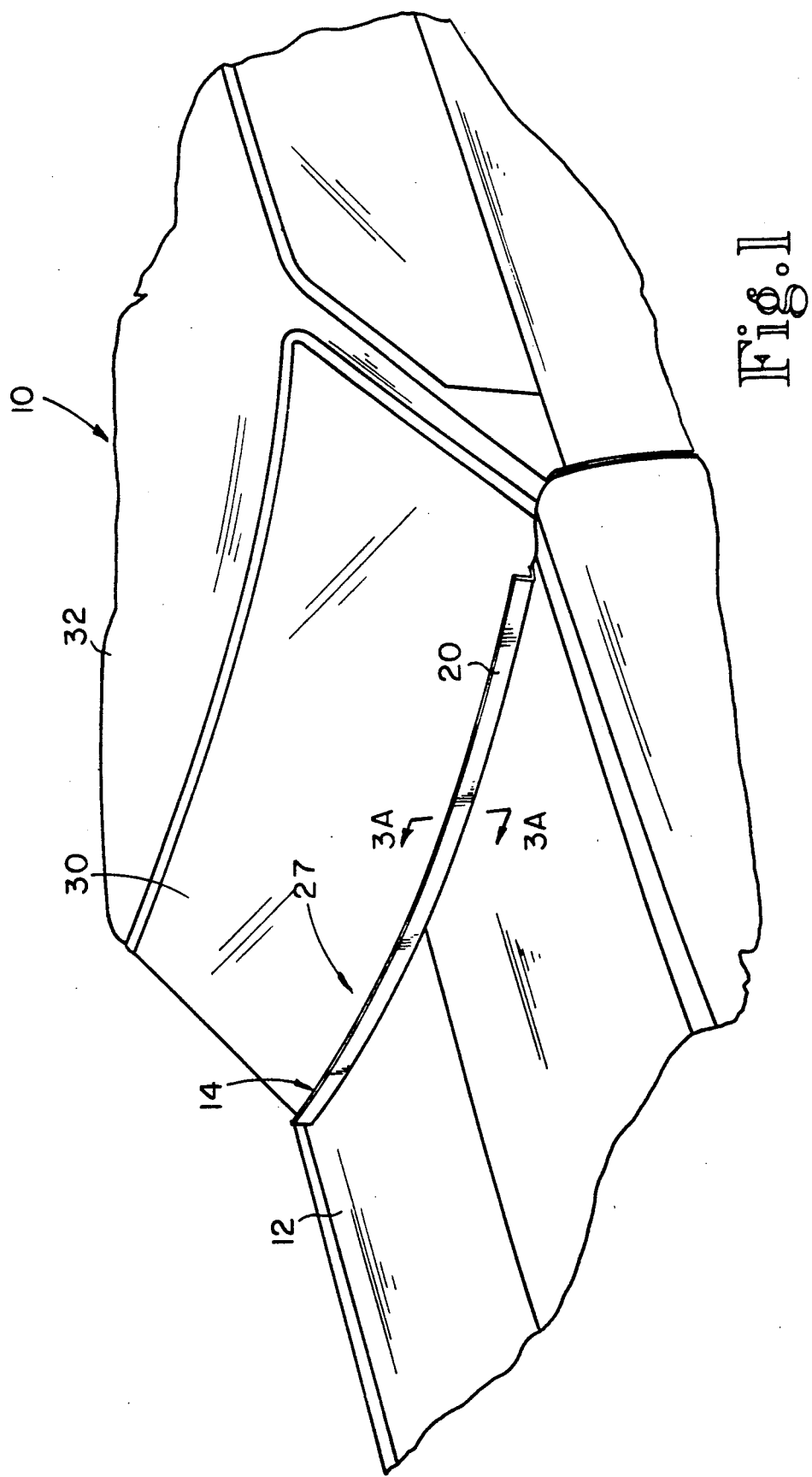
FIG. 1 is a fragmented perspective view of a first embodiment of the deflector of this invention shown mounted to an automobile.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. The preferred embodiments herein described is not intended to be exhaustive or to limit the invention to the precise form disclosed. It is chosen and described to explain the principles of the invention and its application and practical use so that others skilled in the art may utilize its teachings.

Referring now to FIG. 1, reference numeral 10 refers generally to a motor vehicle, shown here as an automobile. Motor vehicle 10 may also be of other types, such as pick-up trucks, mini-vans, race cars or the like which include a front located hood 12. The rear edge of hood 12 has a concave curvature 27 as illustrated.

Figure 2:
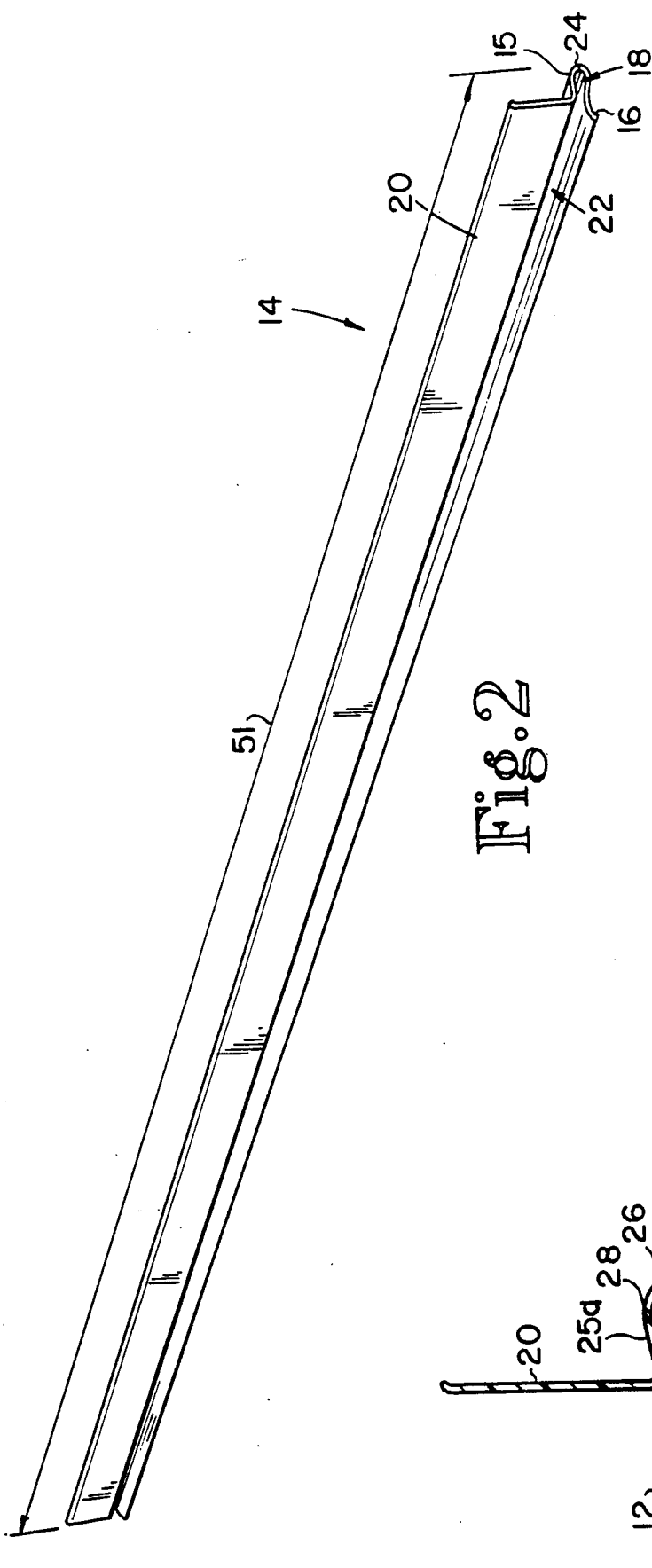
FIG. 2 is a perspective view of the deflector of FIG. 1.
Figure 3A:
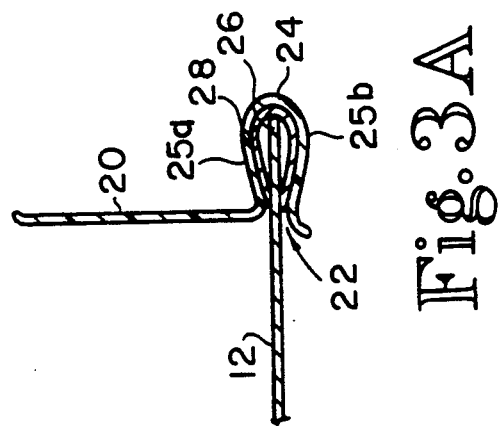
FIG. 3A is a sectional view taken along lines 3A—3A of FIG. 1.

Reference numeral 14 refers generally to the deflector of this invention. Deflector 14, as shown in FIGS. 2 and 3A is preferably formed of an elongated strip of flexible material, usually Lexan ® or other thermoplastic. Deflector 14 may be of any acceptable color, including a clear or transparent color if desired.

FIG. 2 best illustrates the deflector 14 apart from its environment. Deflector 14 includes a lower channel part 15 defined by lower lip 16 and channel 18. Deflector 14 also has an upper integral wall part 20 which is contiguous with channel part 15. Channel 18 is preferably shaped in cross-section as shown in FIG. 3A with a narrowed opening 22 which flares out along laterally elongated upper flange 25a and laterally elongated lower flange 25b towards the closed end portion 24. As shown in the drawings, flange 25a and flange 25b are connected to each other by closed end 24, and narrowed opening 22 is in front of closed end portion 24. Deflector 14 has a width 51 which ordinarily is in excess of forty inches for laterally spanning more than one half of the rear edge 26 of hood 12. Width 51 preferably is about 48 inches, but the plastic may be cut to a shorter width to secure to hoods having a raised central portion which is shorter than width 51.

FIG. 3A illustrates the installation and functional aspects of deflector 14. To install deflector 14 on vehicle 10, channel part 15 is positioned with its opening 22 aligned with the rearward end edge 26 of vehicle hood 12 and pressed onto the hood. Since opening 22 is generally smaller than the hood 12 thickness, the flexibility of deflector 12 allows for a clamp like fit to the hood. If additional securement is desired, tape fasteners 28 of a common variety may be affixed to hood 12 prior to installation, or mechanical fasteners (not shown) may be used.

Figure 3C:
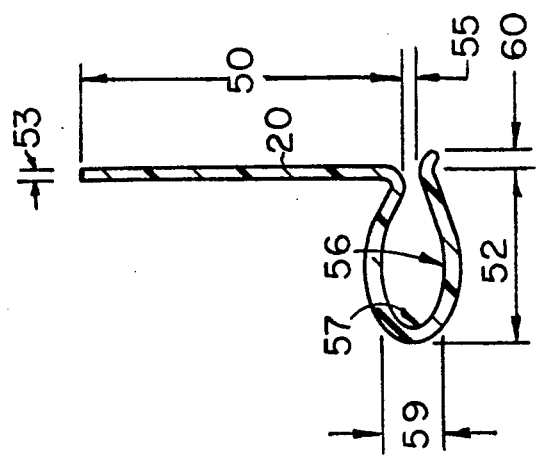
FIG. 3C is a cross-sectional view of the deflector of FIG. 3B showing various free-standing dimensions.
Figure 3B:
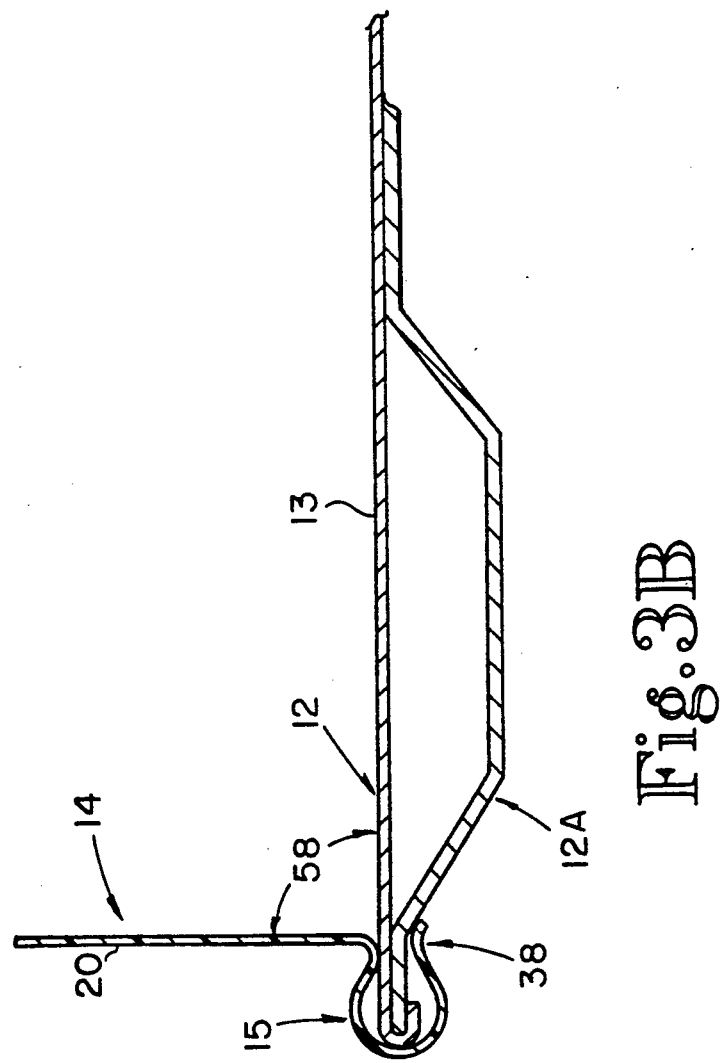
FIG. 3B is a cross-sectional view of a second embodiment of the deflector of this invention on an alternative hood configuration, without adhesive tape.

FIG. 3B and FIG. 3C illustrate the second embodiment of deflector 14, differing from the embodiment of FIGS. 2 and 3A, only in the absence of tape 28. Accordingly, similar reference characters are used. FIG. 3B shows a modified configuration of hood 12 including understructure 12A. Understructure 12A is considerably thicker at a location forward of channel part 15 and integral wall part 20. Such progressively thicker portion begins typically at a distance ¾ to 1 inch forward of the rearmost edge of hood 12. Accordingly, length 52 (see FIG. 3C) of lower channel part 15 is typically not greater than about 1 inch, rearward to forward, and in the preferred embodiment is about 0.75 inches. This relatively short length 52 provides two primary advantages. The first is that it allows a clamping action at 38 (see FIG. 3B) on the thinner portion of hood 12. Second, this relatively short length, in combination with the thickness 53 (see FIG. 3C) of the plastic, ensures that the cross-sectional moment of inertia of deflector 14 about a vertical bending axis is relatively small. With such a small cross-sectional moment of inertia (and corresponding small section modulus), the plastic material allows bending to conform with curvature 27 of the rear edge 26 of hood 12.

FIG. 3B also illustrates that wall part 20 is preferably oriented at an angle 58 with respect to top surface 13 of the hood of about 90°. Although 90° is preferred, other angles may be used with satisfactory results.

FIG. 3C illustrates some preferred dimensions of deflector 14. Preferably, thickness 53 is about 0.050 inches through wall part 20 as well as through the other portions of the channel. This thickness may vary according to design taking into account the modulus of elasticity of the material selected, the main considerations being suitable flexibility to allow deflector 14 to be bent to conform to curvature 27 of the rear edge of the hood while having suitable rigidity to provide sufficient clamping action at 38 to hold channel 15 to the rear edge of the hood and to provide suitable stiffness to allow wall part 20 to resist wind forces.

Wall part 20 has a height 50 which preferably ranges between ½ an inch and 6 inches, and preferably is about 1½ inches high. Narrow portion 22 has gap 55 which ranges between 0 and about 0.05 inches. Lower channel part 15 has a height 59 of about 0.31 inches, as illustrated. Lower lip 16 projects forward of channel portion 15 by a length 60 of about 0.06 inches. Flanges 25a and 25b have a radius of curvature 56 of about 0.75 inches, whereas a tighter radius of curvature 57 of about 0.156 inches is present at closed end portion 24. As stated, these dimensions may vary according to design.

Figure 4:
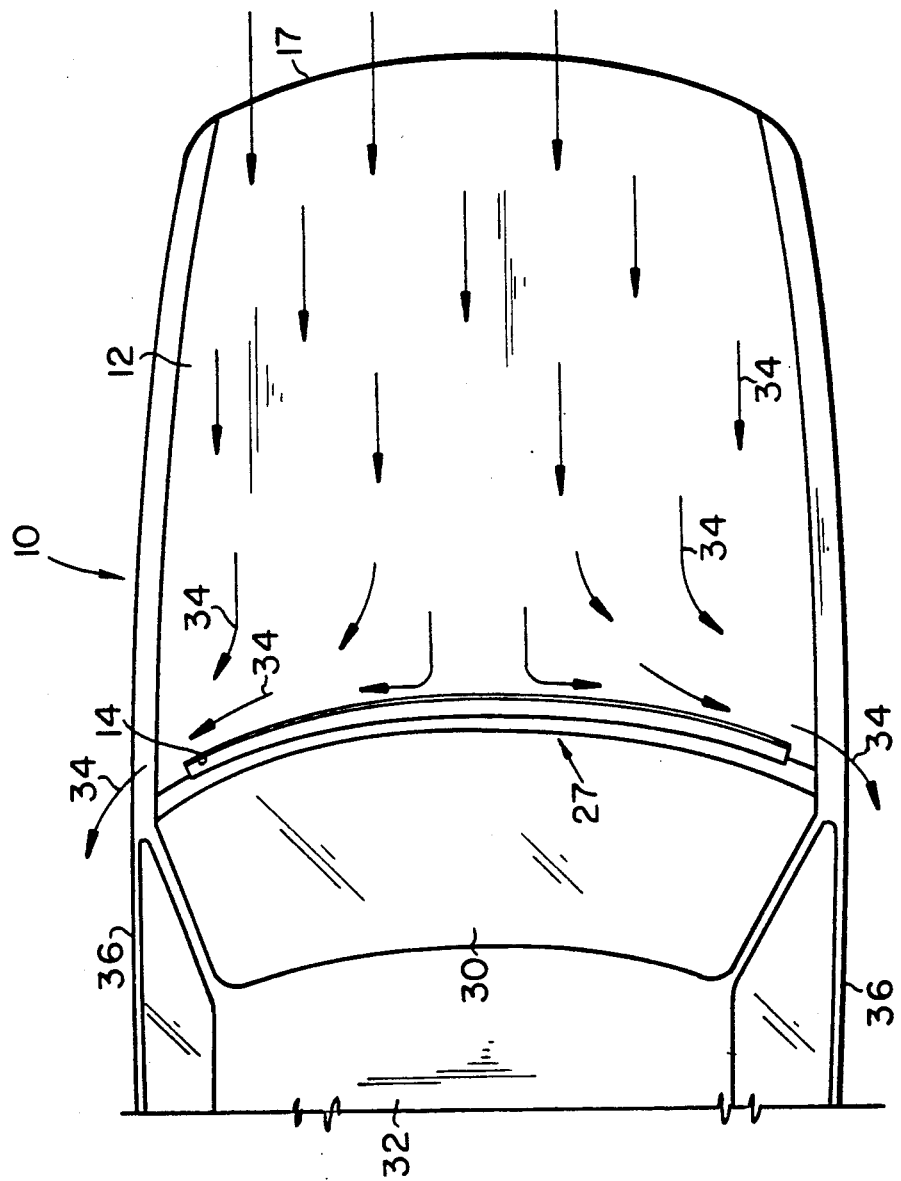
FIG. 4 is a fragmented top plan view of the vehicle and deflector of FIG. 1.

FIG. 4 illustrates a top plan view showing curvature 27 of the rear edge of hood 12 and showing how deflector 14 bends to conform to curvature 27. Also, FIG. 4 illustrates how deflector 14 is in close proximity to the base of windshield 30, and preferably is within 10 inches thereof. Arrows 34 depict air flow utilizing the present invention.

FIG. 5 further illustrates arrows 34 depicting air flow and shows wall portion 20 projecting above hood 12.

With deflector 14 mounted to hood 12 as shown, wall part 20 extends above the horizontal level of the hood to deflect bugs, debris, water and air upwardly of the car windshield 30 and over the top 32 and around the sides 36 of vehicle 10 as illustrated by arrows 34 during vehicle motion. By so deflecting these oncoming materials over vehicle top 32, handling and aerodynamic response is increased, windshield 30 remains clean, and gas mileage is increased. These effects are noticeable at all vehicle speeds, but are more pronounced as speed increases.

Figure 7B:
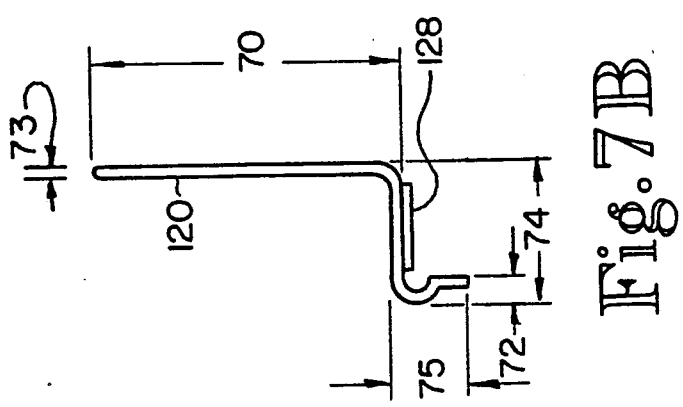
FIG. 7B is a side view of the deflector of FIG. 6 showing various free-standing dimensions.

FIGS. 6, 7A and 7B illustrate an alternative embodiment of the present invention. The primary difference between this embodiment and the previous embodiments is that rather than using a channel part, such as lower channel part 15, to secure the wall part to the rear edge of the hood, upper integral wall part 120 is secured to the top surface 113 of hood 112 by use of adhesive 128. Furthermore, deflector 114 has a horizontal flange 140 connected to and projecting horizontally from upper wall part 120 to lie along top surface 113 of the rear edge 126 of the hood. Downward flange 142 is connected to and projects downwardly from horizontal flange 140 and lies behind rear edge 126 of hood 112. Hood 112 includes both understructure 112a (similar to understructure 12A, previously described), and includes downward lip 112b. The presence of downward lip 112b on certain makes and models of vehicles makes the use of a channel portion 15 to secure the air deflector to the hood less practical. Note that downward flange 142 includes a rearward bulge 144 (see FIG. 7A) to closely conform to the profile of hood 112 and lip 112b. As with tape 28 described in the previous embodiment, tape 128 acts an adhesive to secure to the hood. Preferably, tape 128 is double adhesive sided tape with adhesive on the top and bottom sides thereof. This double adhesive sided tape is adhered to the bottom side of flange 140, and may include a peel-off covering (not shown) on the bottom adhesive side of the tape for packaging of the present invention. Such tape is available on the open market, such as from the 3M Company in Minnesota.

The preferred dimensions of deflector 114 are as follows. The width 71 is similar to width 51 previously described, namely in excess of 40 inches and preferably about 48 inches. As before, this width may be cut to conform to the width of a particular vehicle. Referring to FIG. 7B, height 70 typically ranges between ½ and 6 inches but is preferably about 1½ inches. Height 75 is preferably less than one inch and as illustrated is about 0.49 inches. Note that the height of bulge 144 is about 0.24 inches. The length 72 of bulge 144 is about 0.115 inches. As before, the thickness 73 is preferably about 0.05 inches and in conjunction with length 74 (typically about 1 inch or less) combine to form a cross-sectional configuration of deflector 114 which has a sufficiently low cross-sectional moment of inertia (and corresponding low section modulus) to allow bending to conform to the curvature 27 of the rear edge of the hood. As before, deflector 114 is preferably made of Lexan ® or other thermoplastic and may be opaque, clear or any transparent color. Thickness 73 is preferably uniform throughout the thickness of not only upper wall part 120 but flanges 140 and 142 as well.

Fabrication of the present invention preferably is accomplished by starting with a flat sheet of Lexan ®, heating it, and bending it to the illustrated profiles, although other forming techniques such as bending, molding or extrusion also are contemplated.

Figure 8A:
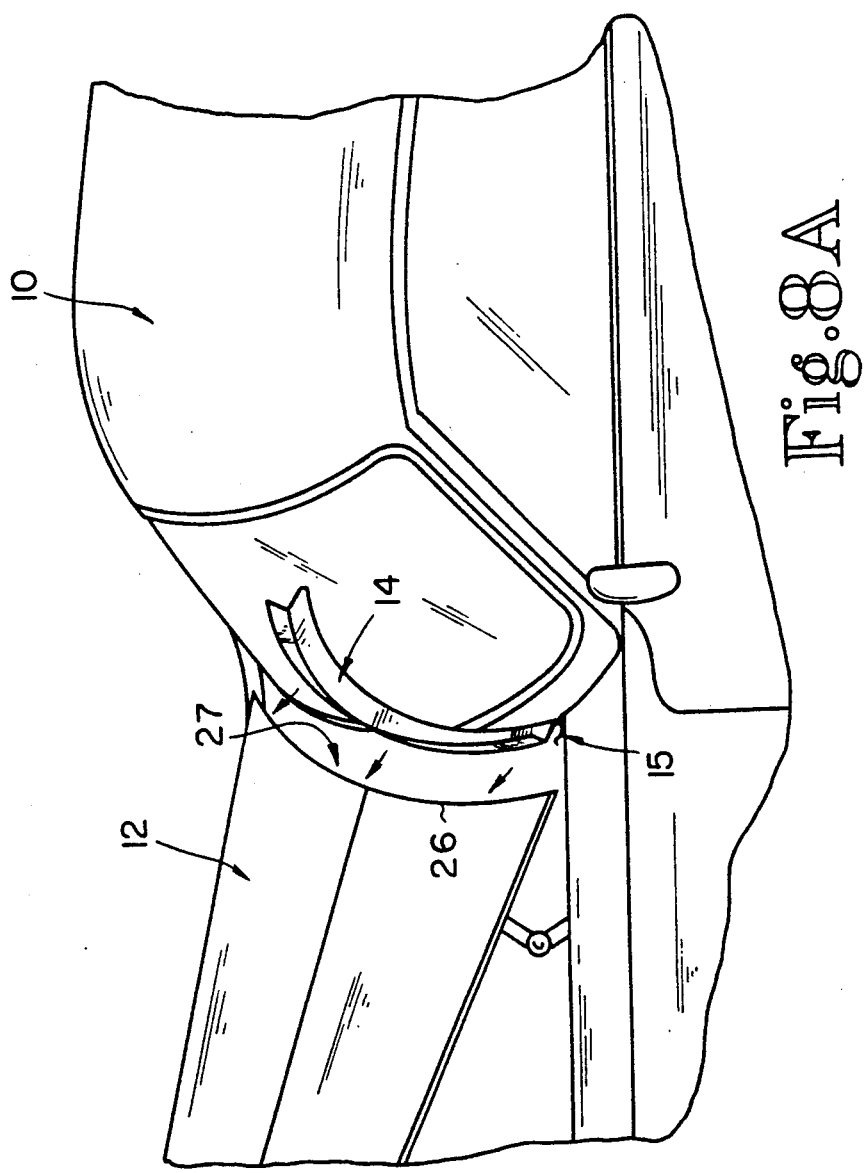
FIG. 8A is a fragmented perspective view of the deflector of FIG. 3B being secured to the rear edge of an open hood.
Figure 9:
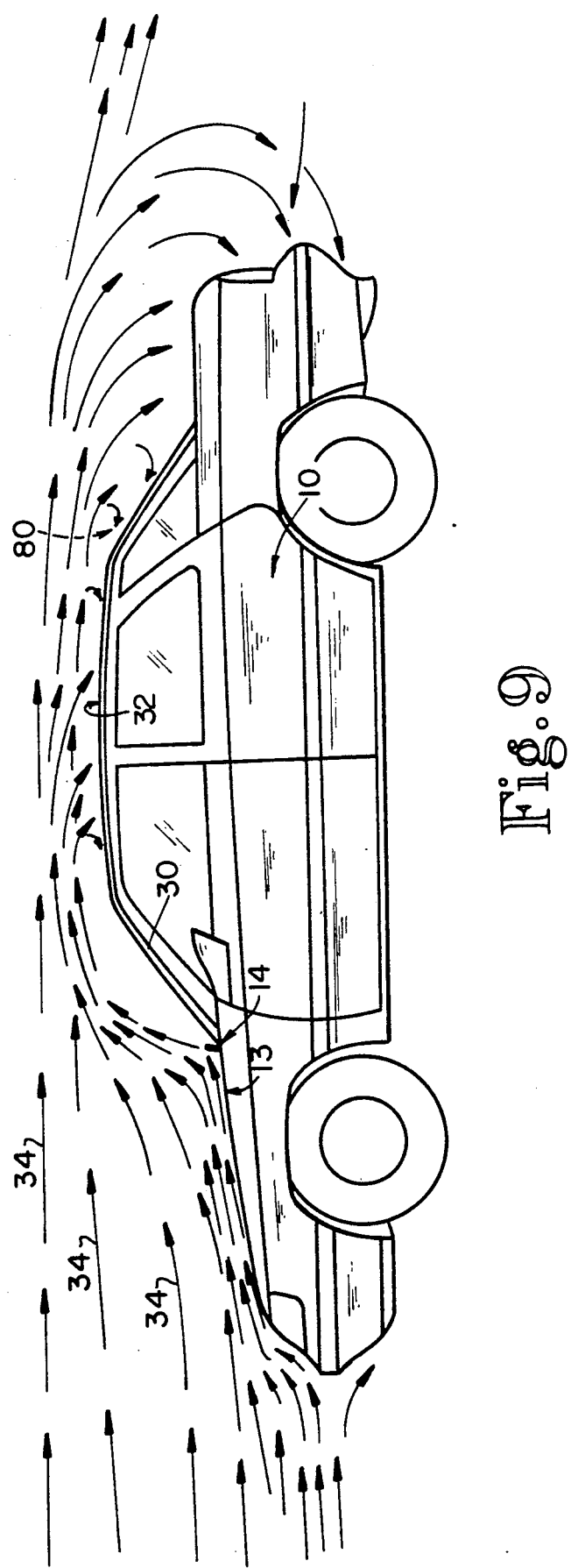
FIG. 9 is a side elevational view of a vehicle equipped with the present invention illustrating air flow.

FIGS. 8A, 8B and 9 further illustrate the present invention in combination with vehicle 10. FIG. 8A illustrates deflector 14 including channel portion 15 being clipped on to rear edge 26 of hood 12, as indicated by the three forwardly directed arrows. As illustrated in FIG. 8A, hood 12 is open or "up." The clamping action of channel portion 15 is sufficient that deflector 14 will remain secured along the curvature 27 of rear edge 26 of the hood, with the hood down and with the hood up, being independent of the remainder of the vehicle 10. Similarly, FIG. 8B illustrates the alternative embodiment, deflector 114, with its adhesive 128 being placed forwardly onto rear edge 126 of hood 112 along curvature 27. Likewise, deflector 114 remains secured on the rear edge of the hood independently from the remainder of the vehicle so the deflector remains secured to the rear edge of the hood upon opening of the hood. FIG. 9 further illustrates air flow arrows 34 over vehicle 10 with the present invention secured to the hood. Vortex 80 is shown behind the cab portion of vehicle 10 along with similar air flow characteristics near the rear portion of the vehicle.

It is understood that the invention is not limited to the details above given, but may be modified by the scope of the following claims. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An air deflector for use on a vehicle having a windshield, a hood in front of the windshield and a rear edge of the hood along the windshield, comprising:
   an upper wall part projecting above the hood and spanning laterally in front of the windshield for deflecting oncoming air upwardly; and,
   means for securing said upper wall part to the rear edge of the hood independently from the remainder of the vehicle so that the deflector remains secured to the rear edge of the hood upon opening of the hood, wherein said means for securing comprises a channel part having a generally C-shaped cross section with an upper flange and a lower flange which converge to a narrow opening forming a clamp for clamping to the rear edge fo the hood, and wherein said upper wall part extents upwardly from a forward edge of said upper flange of said channel part.

2. The deflector of claim 1 wherein the rear edge of the hood viewed from a top plan view has a curvature and wherein said deflector is formed from plastic having a thickness of about 0.05 inches.

3. The deflector of claim 2 wherein said channel part has a length, rearward to forward, not substantially in excess of one inch.

4. The deflector of claim 3 wherein said deflector has a lateral width in excess of about forty inches for laterally spanning more than one half of the rear edge of the hood.

5. The deflector of claim 4 wherein said upper wall part is about one and a half inches high.

6. The deflector of claim 1 wherein said deflector has a lateral width in excess of about forty inches for laterally spanning more than one half of the rear edge of the hood.

7. The deflector of claim 1 wherein said upper wall part is about one and a half inches high.

8. The deflector of claim 1 wherein said narrow opening is less than about 0.05 inches and wherein the rear edge of the hood has a thickness greater than 0.05 inches.

9. An air deflector for use on a vehicle having a windshield, a hood in front of the windshield and a rear edge of the hood along the windshield, comprising:
   an upper wall part projecting above the hood and spanning laterally in front of the windshield for deflecting oncoming air upwardly; and,
   means for securing said upper wall part to the rear edge of the hood independently from the remainder of the vehicle so that the deflector remains secured to the rear edge of the hood upon opening of the hood, wherein said means for securing further includes:
   (a) a horizontal flange connected to and projecting horizontally in a rearward direction from said upper wall part to lie along a top surface of the rear edge of the hood; and,
   (b) a downward flange connected to and projecting generally perpendicularly downwardly from a rear edge of said horizontal flange to lie behind the rear edge of the hood.

10. The deflector of claim 9 wherein the rear edge of the hood viewed from a top plan view has a curvature and wherein said deflector is formed from plastic having a thickness of about 0.05 inches, wherein said horizontal flange has a length, rearward to forward, not greater than about one inch, and wherein said downward flange has a height not greater than about one inch.

11. The deflector of claim 1 wherein said upper wall part comprises transparent material.

* * * * *